(12) United States Patent
Aisaka

(10) Patent No.: US 9,580,937 B2
(45) Date of Patent: Feb. 28, 2017

(54) INFORMATION PROCESSING SYSTEM, ELECTRONIC DEVICE, AND METHOD WITH DEVICE THEFT PREVENTION CAPABILITIES

(71) Applicant: Kabushiki Kaisha Toshiba, Minato-ku, Tokyo (JP)

(72) Inventor: Hideki Aisaka, Hino Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 27 days.

(21) Appl. No.: 14/675,264

(22) Filed: Mar. 31, 2015

(65) Prior Publication Data

US 2016/0090757 A1  Mar. 31, 2016

Related U.S. Application Data

(60) Provisional application No. 62/057,732, filed on Sep. 30, 2014.

(51) Int. Cl.
*E05B 73/00* (2006.01)
*E05B 65/00* (2006.01)
*G06F 1/00* (2006.01)

(52) U.S. Cl.
CPC ....... *E05B 73/0082* (2013.01); *E05B 65/0067* (2013.01); *G06F 1/00* (2013.01); *E05B 2073/0088* (2013.01)

(58) Field of Classification Search
CPC .............. E05B 73/0082; E05B 65/0067; E05B 2073/0088; G06F 1/00
See application file for complete search history.

(56) References Cited

U.S. PATENT DOCUMENTS

| | | | | |
|---|---|---|---|---|
| 6,788,527 B2* | 9/2004 | Doczy | ................... | G06F 1/1626 312/208.1 |
| 7,206,196 B2* | 4/2007 | Ghosh | ..................... | G06F 1/162 248/917 |
| 8,023,252 B2* | 9/2011 | Dehaan | ............... | E05B 73/0005 361/679.01 |
| 8,427,826 B2* | 4/2013 | Sullivan | ................ | G06F 1/1616 248/346.06 |
| 8,446,359 B2* | 5/2013 | Doczy | ................... | G06F 1/1626 345/156 |
| 8,909,838 B2* | 12/2014 | Hsu | ........................ | G06F 1/1632 710/303 |

(Continued)

FOREIGN PATENT DOCUMENTS

JP  11-073241 A  3/1999
JP  2009-151708 A  7/2009

*Primary Examiner* — Brian Miller
(74) *Attorney, Agent, or Firm* — Knobbe, Martens, Olson & Bear LLP

(57) ABSTRACT

According to one embodiment, an information processing system includes a first electronic device, a second electronic device connectable with the first electronic device, and a security lock. The security lock is configured to attach to the second electronic device when the first electronic device and the second electronic device are connected with each other, the security lock for preventing the second electronic device from being stolen, and in association with the security lock, a first lock for preventing separation of the first electronic device from the second electronic device.

13 Claims, 8 Drawing Sheets

(56) References Cited

U.S. PATENT DOCUMENTS

| | | | | |
|---|---|---|---|---|
| 2009/0145184 A1* | 6/2009 | Cheaz | ................ | E05B 73/0005 |
| | | | | 70/266 |
| 2009/0161303 A1* | 6/2009 | Hirota | ................... | G06F 1/1632 |
| | | | | 361/679.01 |
| 2010/0306564 A1* | 12/2010 | Kojo | ..................... | G06F 1/1615 |
| | | | | 713/323 |
| 2014/0362517 A1* | 12/2014 | Moock | ................ | E05B 73/0082 |
| | | | | 361/679.43 |
| 2014/0376181 A1* | 12/2014 | Zhang | .................. | E05B 47/026 |
| | | | | 361/679.55 |
| 2015/0020189 A1* | 1/2015 | Soffer | .................... | G06F 21/85 |
| | | | | 726/16 |

* cited by examiner

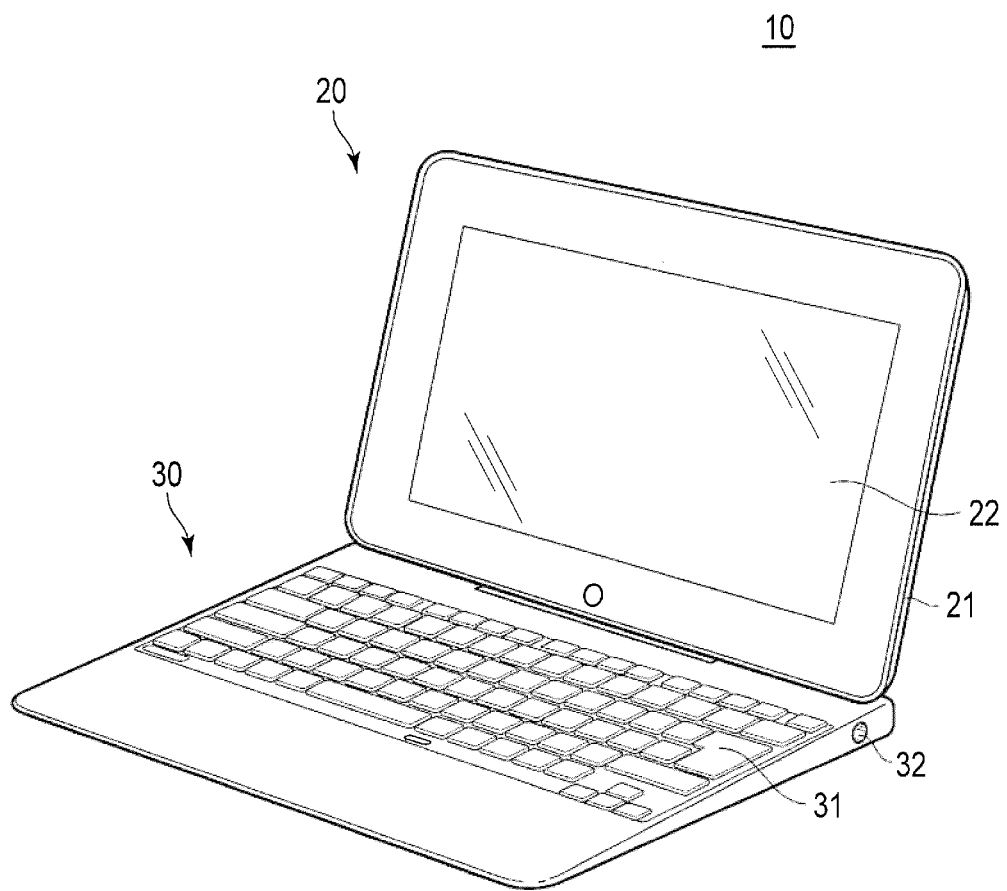
F I G. 1

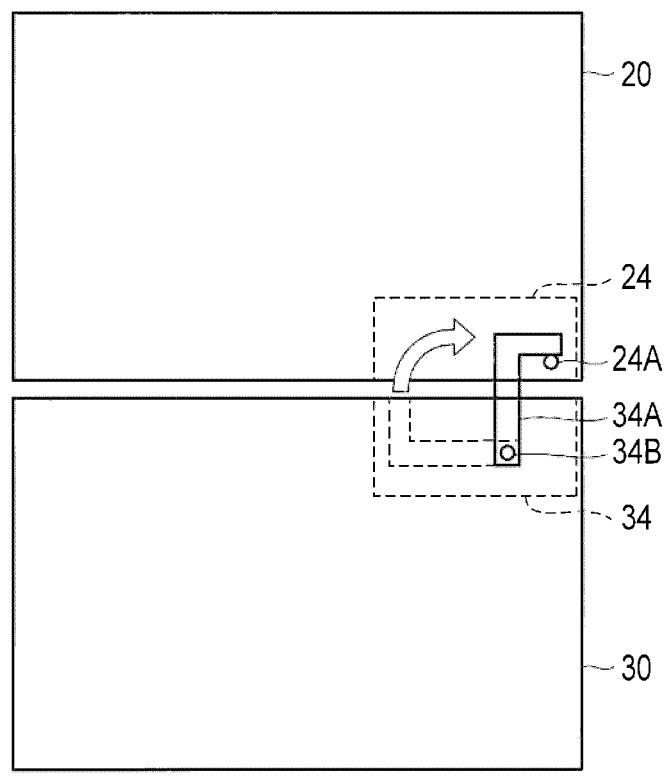
F I G. 6

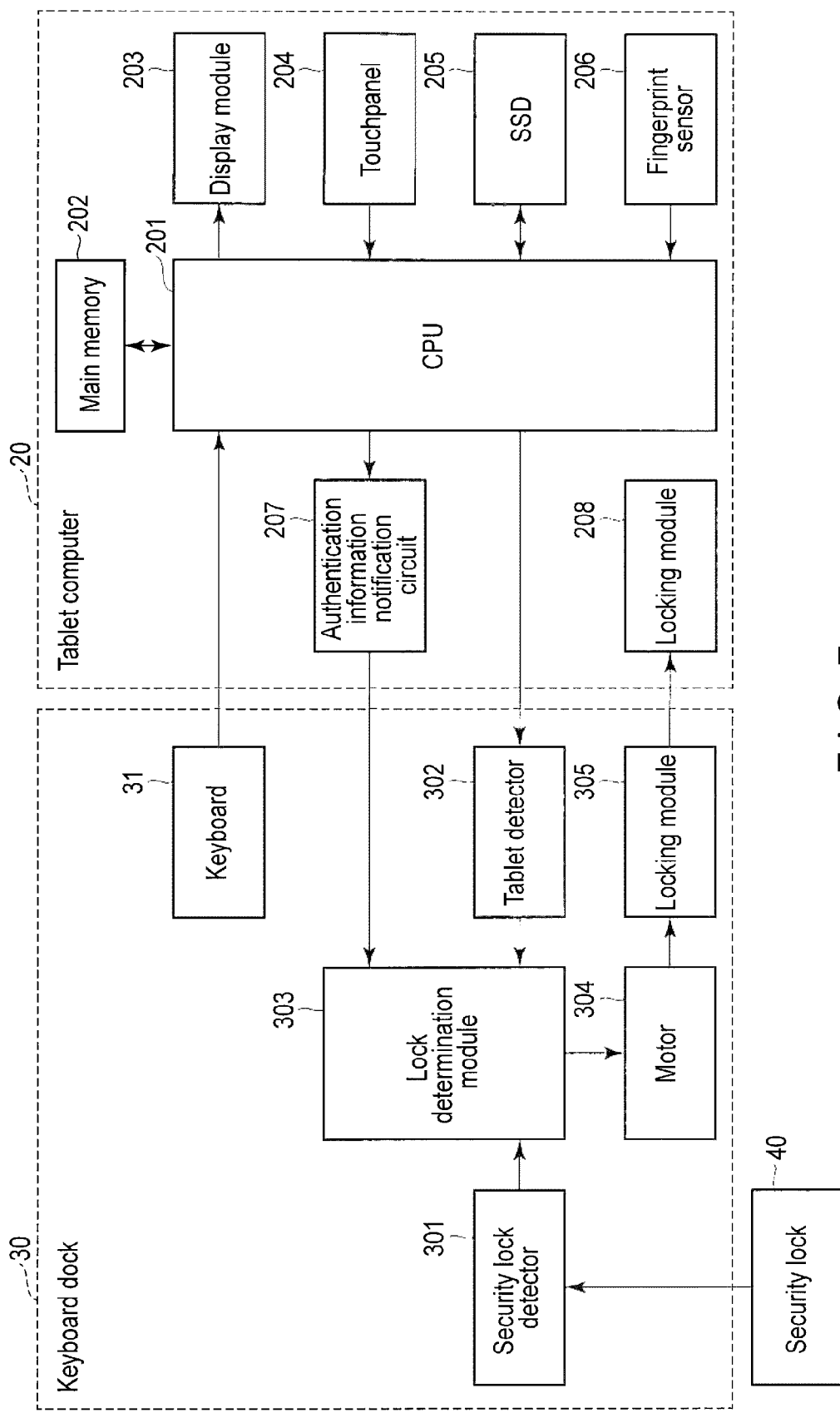
F I G. 7

| User authentication | Tablet computer | | Keyboard dock | |
| --- | --- | --- | --- | --- |
| | Security lock | | Security lock | |
| | Locked state (Engaged state) | Released state | Locked state (Engaged State) | Released state |
| Invalid | Inseparable | Separable | Unremovable | Removable |
| Valid | Separable | Separable | Unremovable | Removable |

F I G. 8

INFORMATION PROCESSING SYSTEM, ELECTRONIC DEVICE, AND METHOD WITH DEVICE THEFT PREVENTION CAPABILITIES

CROSS-REFERENCE TO RELATED APPLICATIONS

This application claims the benefit of U.S. Provisional Application No. 62/057,732, filed Sep. 30, 2014, the entire contents of which are incorporated herein by reference.

FIELD

Embodiments described herein relate generally to an information processing system, an electronic device and a method.

BACKGROUND

Recently, mobile electronic devices called tablets have become widespread. Accordingly, a two-in-one computer, which can be used as both a tablet and a notebook computer, is gradually gaining popularity. When a two-in-one computer is used as a notebook computer, the user connects the tablet to a keyboard dock. In this manner, the tablet can be used as a display, and the keyboard dock can be used as a keyboard.

In connection with the spread of two-in-one computers, antitheft products for two-in-one computers have become popular. An example of such products is an antitheft tether (for example, a Kensington lock). By the antitheft tether, when the keyboard dock is locked in a state where the two-in-one computer can be used as a notebook computer (in other words, the tablet is connected with the keyboard dock), the tablet is also locked (in other words, the tablet cannot be separated from the keyboard dock).

However, when the antitheft tether is employed, the tablet is locked in association with the lock of the keyboard dock as described above. Thus, the use of the antitheft tether is disadvantageous in a case where the two-in-one computer is used as a tablet (in other words, only the tablet is carried). Specifically, to carry the tablet, the user must release the antitheft tether and separate the tablet from the keyboard dock. After that, the user must lock the keyboard dock again by using the antitheft tether. Thus, the use of the antitheft tether takes much trouble.

To solve the above problem, the realization of a new technique is required.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective illustration showing an example of the outer appearance of a two-in-one computer according to an embodiment.

FIG. 6 is shown for explaining a key structure of the keyboard dock included in the two-in-one computer according to the embodiment.

FIG. 7 is a block diagram showing examples of function structures of the two-in-one computer according to the embodiment.

FIG. 8 is shown for explaining conditions for releasing a lock which prevents the tablet computer included in the two-in-one computer from being separated from the keyboard dock included in the two-in-one computer according to the embodiment.

DETAILED DESCRIPTION

Figure 2:
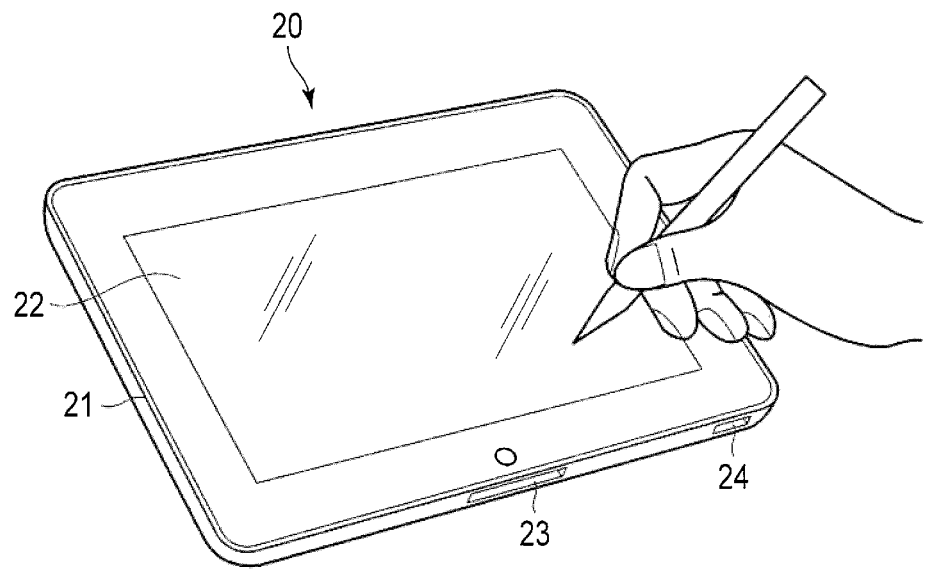
FIG. 2 is a perspective illustration showing an example of the outer appearance of a tablet computer included in the two-in-one computer according to the embodiment.

Various embodiments will be described hereinafter with reference to the accompanying drawings.

In general, according to one embodiment, an information processing system includes a first electronic device, a second electronic device connectable with the first electronic device, and a security lock. The security lock is configured to attach to the second electronic device when the first electronic device and the second electronic device are connected with each other, the security lock for preventing the second electronic device from being stolen, and in association with the security lock, a first lock for preventing separation of the first electronic device from the second electronic device. The first electronic device includes an authentication processor to authenticate a user, and a notification processor to notify the second electronic device of authentication information indicating a result of authentication by the authentication processor. The second electronic device includes a detector to detect whether the security lock is engaged, and output a detection signal indicating whether the security lock is engaged at time intervals, and a determination processor to determine whether the first lock is to be released based on the notified authentication information when the detection signal indicates that the security lock is engaged, and an unlocking processor to release the first lock while the security lock is engaged when the determination processor determines that the first lock is to be released.

FIG. 1 is a perspective illustration showing an example of the outer appearance of a two-in-one computer 10 according to an embodiment. The two-in-one computer 10 shown in FIG. 1 includes a tablet portion (hereinafter, referred to as a tablet computer) 20 and a keyboard dock portion (hereinafter, referred to as a keyboard dock) 30. The two-in-one computer 10 may be called an information processing system. In the present embodiment, one of two electronic devices included in the two-in-one computer 10 is the keyboard dock 30. However, the keyboard dock 30 may be, for example, a docking station (for example, a desk cradle or an audio dock) which is an extended unit of the tablet computer 20.

As shown in FIG. 1, the tablet computer 20 includes a main body 21 and a touchscreen display 22. The touchscreen display 22 is attached such that the touchscreen display 22 overlaps with the upper surface of the main body 21. The main body 21 has a housing having a thin-box shape. A flat-panel display and a sensor configured to detect the contact position of a pen or a finger on the screen of the flat-panel display are incorporated into the touchscreen display 22. The flat-panel display may be, for example, a liquid crystal display (LCD) device. As the sensor, for example, a capacitive touchpanel or an electromagnetic induction digitizer may be employed. This specification assumes that both of the two types of sensors, which are a digitizer and a touchpanel, are incorporated into the touchscreen display.

Now, the tablet computer 20 is explained in detail with reference to FIG. 2.

FIG. 2 is a perspective illustration showing an example of the outer appearance of the tablet computer 20 included in the two-in-one computer 10 according to the embodiment. The tablet computer 20 includes, in addition to the above-described main body 21 and touchscreen display 22 in FIG. 1, a keyboard dock connection terminal 23 for connection with the keyboard dock 30, and a keyhole 24 into which a key incorporated into the keyboard dock 30 is inserted. FIG. 2 illustrates one keyboard dock connection terminal 23. However, the number of keyboard dock connection terminals 23 is not limited to one. The number of keyboard dock connection terminals 23 may be any number as long as it is equal to the number of tablet computer connection terminals 33 explained later. In a similar manner, although FIG. 2 illustrates one keyhole 24, the number of keyholes 24 is not limited to one. The number of keyholes 24 may be any number as long as it is equal to the number of keys which are incorporated into the keyboard dock 30. In FIG. 2, the keyboard dock connection terminal 23 is provided in the center of the lower surface of the tablet computer 20, and the keyhole 24 is provided on the left side of the lower surface of the tablet computer 20. However, the positions of the keyboard dock connection terminal 23 and the keyhole 24 are not limited to the positions shown in FIG. 2. Specifically, the keyboard dock connection terminal 23 and the keyhole 24 may be provided at any positions as long as they are hidden from the outside (they do not receive interference from the outside) in a state where the tablet computer 20 is connected with the keyboard dock 30.

Returning to the explanation of FIG. 1, the keyboard dock 30 includes a keyboard 31 and a security lock connection terminal 32. The keyboard 31 is an input interface. The security lock connection terminal 32 is a terminal for connection with a security lock (antitheft tether) 40 explained later.

Now, the keyboard dock 30 is explained in detail with reference to FIG. 3.

Figure 3:
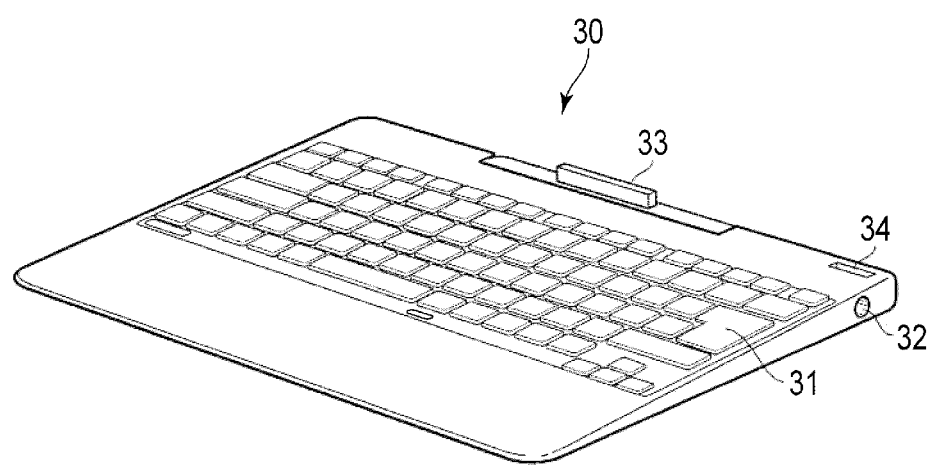
FIG. 3 is a perspective illustration showing an example of the outer appearance of a keyboard dock included in the two-in-one computer according to the embodiment.

FIG. 3 is a perspective illustration showing an example of the outer appearance of the keyboard dock 30 included in the two-in-one computer 10 according to the embodiment. The keyboard dock 30 includes, in addition to the above-described keyboard 31 and security lock connection terminal 32 in FIG. 1, the tablet computer connection terminal 33 for connection with the tablet computer 20, and a key structure 34 including a built-in key for preventing the tablet computer 20 from being separated from the keyboard dock 30 (in other words, for maintaining the connected state). In FIG. 3, only the security lock connection terminal 32 is provided in a side surface of the keyboard dock 30. However, for example, a Universal Serial Bus (USB) port, a High-definition Multimedia Interface (HDMI) output terminal, and an RGB port may be further provided in the side surface of the keyboard dock 30.

Figure 4:
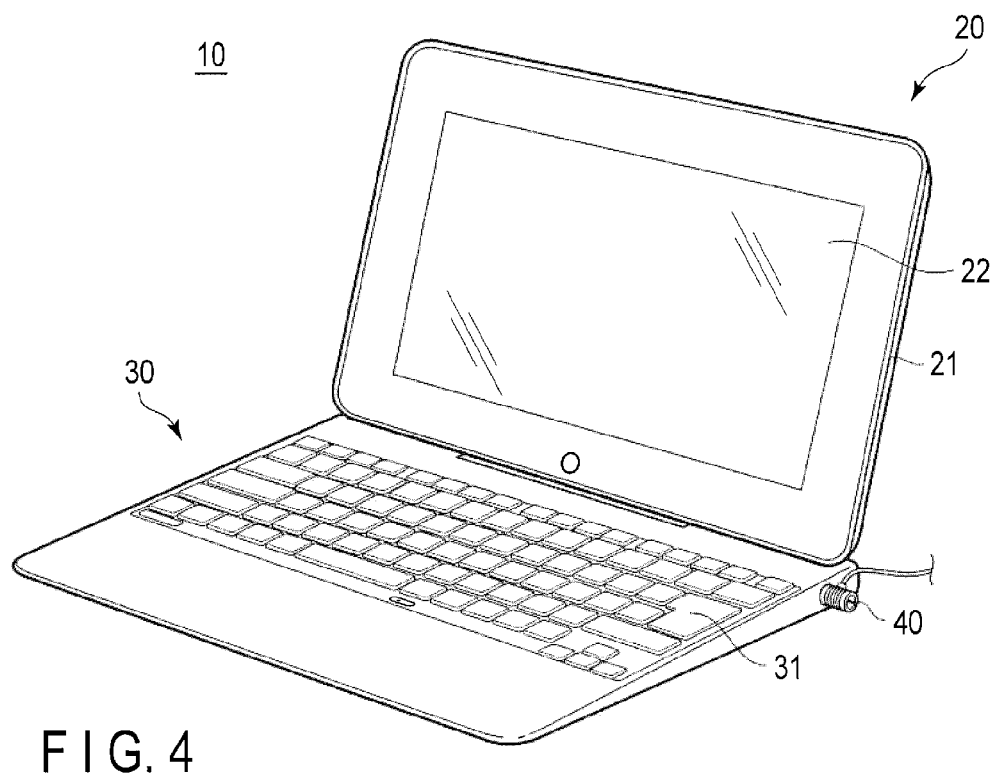
FIG. 4 is shown for explaining the general outline of functions provided in the two-in-one computer according to the embodiment.
Figure 5:
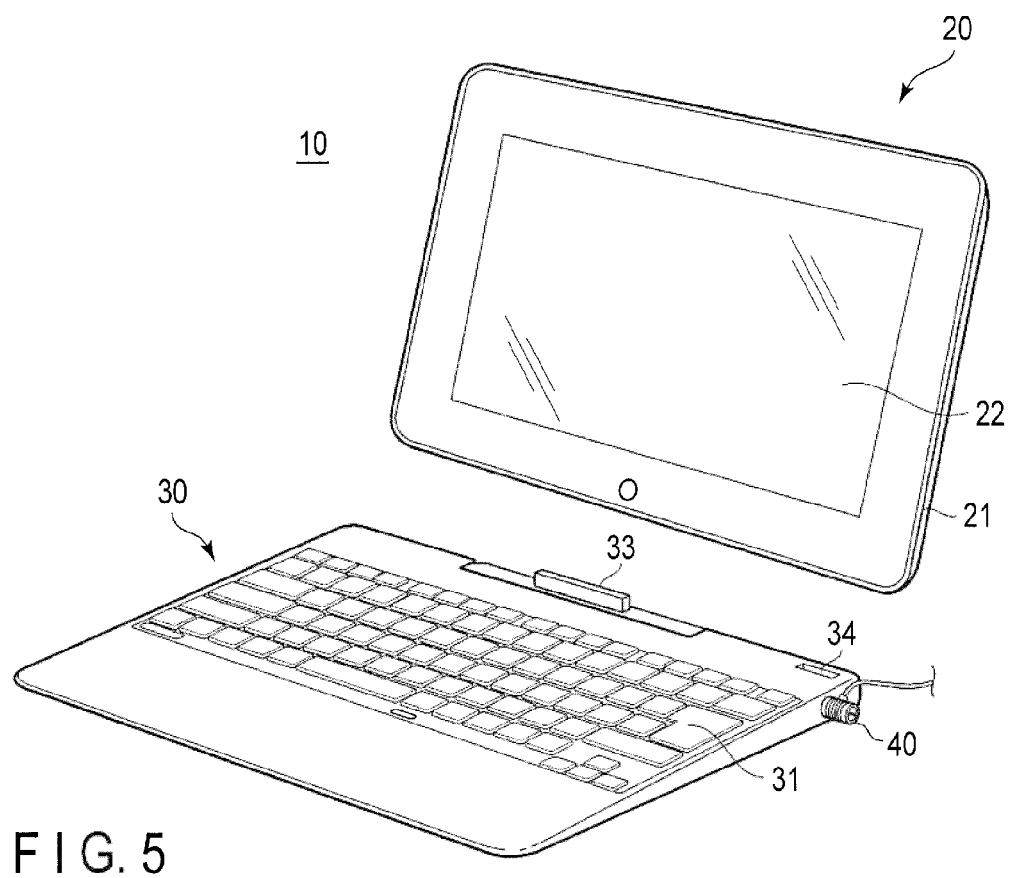
FIG. 5 is shown for explaining the general outline of functions provided in the two-in-one computer according to the embodiment.

Now, this specification explains the general outline of functions provided in the two-in-one computer 10 according to the embodiment, referring to FIG. 4 and FIG. 5.

FIG. 4 and FIG. 5 are shown for explaining the general outline of functions provided in the two-in-one computer 10 according to the embodiment. As shown in FIG. 4, when the security lock 40 is inserted into the security lock connection terminal 32 provided in the side surface of the keyboard dock 30, the keyboard dock 30 is locked by the security lock 40 in order to prevent theft (a lock is engaged). In association with this, the keyboard dock 30 is locked by the key structure 34 in order to prevent the separation from the tablet computer 20 (a (first) lock is engaged in an associated manner).

Even when the lock for preventing the separation of the keyboard dock 30 from the tablet computer 20 is engaged in association with the lock by the security lock 40 as shown in FIG. 4, the two-in-one computer 10 of the present embodiment is configured to release only the lock by the key structure 34 while the lock by the security lock 40 is engaged (while the security lock 40 is inserted) as shown in FIG. 5. In this manner, it is possible to separate the tablet computer 20 from the keyboard dock 30 without much trouble.

Now, this specification explains the key structure 34 of the keyboard dock 30 included in the two-in-one computer 10 according to the embodiment.

FIG. 6 is shown for explaining the key structure 34 of the keyboard dock 30 included in the two-in-one computer 10 according to the embodiment. As shown in FIG. 6, the key structure 34 includes a key (hook) 34A. In order to prevent the separation of the tablet computer 20 from the keyboard dock 30, the key structure 34 moves the key 34A based on a supporting point 34B such that the key 34A is inserted into the keyhole 24. The key structure 34 fixes the key 34A by a fixing pin 24A included in the keyhole 24. In this manner, the lock for preventing the separation of the tablet computer 20 from the keyboard dock 30 is engaged. In a similar manner, in order to separate the tablet computer 20 from the keyboard dock 30, the key structure 34 moves the key 34A based on the supporting point 34B such that the key 34A is separated from the fixing pin 24A. The key structure 34 places the key 34A back in the key structure 34. In this manner, the tablet computer 20 can be separated from the keyboard dock 30 (in other words, the lock is released).

To realize the functions explained by using FIG. 5, the two-in-one computer 10 includes various modules as shown in FIG. 7. Specifically, the tablet computer 20 includes a central processing unit (CPU) 201, a main memory 202, a display module 203, a touchpanel 204, a solid state drive (SSD) 205, a fingerprint sensor (an authentication processor) 206, an authentication information notification circuit (an notification processor) 207 and a locking module 208. The keyboard dock 30 includes the keyboard 31, a security lock detector 301, a tablet detector 302, a lock determination module (a receiver and a determination processor) 303, a motor 304 and a locking module (an unlocking processor) 305.

Hereinafter, this specification explains the function structures of the tablet computer 20. Since the display module 203 corresponds to the above-described flat-panel display of the touchscreen display 22, the detailed explanation of the display module 203 is omitted. In a similar manner, since the touchpanel 204 corresponds to the above-described sensor of the touchscreen display 22, the detailed explanation of the touchpanel 204 is omitted.

The CPU 201 is a processor configured to control the operations of various modules of the tablet computer 20. The CPU 201 executes various types of software loaded to the main memory 202 from the SSD 205 which is a storage device. The software includes, for example, an operating system (OS) and various application programs. The CPU 201 has a function for, when the tablet computer 20 is connected with the keyboard dock 30, arbitrarily outputting, to the keyboard dock 30, a tablet detection signal indicating the connected state (in other words, a state in which the keyboard dock connection terminal 23 is inserted into the tablet connection terminal 33).

The fingerprint sensor 206 reads the fingerprint of the finger held over the fingerprint sensor 206, and outputs the fingerprint information indicating the read fingerprint to the CPU 201. After the CPU 201 receives the input of the fingerprint information output from the fingerprint sensor 206, the CPU 201 compares the received fingerprint information to fingerprint information indicating a fingerprint registered in advance (for example, a fingerprint registered at the time of purchase of the tablet computer), and performs the following authentication process. When the fingerprints shown by the two fingerprint information items are identical, the CPU 201 determines that the read fingerprint is the fingerprint of the user of the tablet computer 20 (in other words, the CPU 201 validates the user authentication). When the fingerprints shown by the two fingerprint information items are not identical, the CPU 201 determines that the read fingerprint is not the fingerprint of the user of the tablet computer 20 (in other words, the CPU 201 invalidates the user authentication). Authentication information indicating the result of the authentication process (in other words, authentication information indicating the validity or invalidity of the user authentication) is arbitrarily output to the keyboard dock 30 via the authentication information notification circuit 207.

In the present embodiment, a fingerprint is used for authenticating the user of the tablet computer 20. However, for example, biological information other than a fingerprint (such as a voiceprint or a palm print) may be used. For example, when a palm print is employed in place of a fingerprint, a process similar to the above authentication process is executed by using the palm print of the palm held over a predetermined position of the tablet computer 20 (in other words, over a palm print sensor configured to read a palm print). To authenticate the user of the tablet computer 20, an IC card (smart card) may be used in place of the above-described biological information. In this case, a process similar to the above authentication process is executed by using identification information unique to the IC card held over a predetermined position of the tablet computer 20 (in other words, an IC sensor configured to read an IC card). To authenticate the user of the tablet computer 20, a wearable device configured to be worn by the user (and including an NFC function) may be used. In this case, a process similar to the above authentication process is executed by using identification information unique to the wearable device coming close to the tablet computer 20 (in other words, to the range which can be read by the tablet computer 20). In the above explanation, as examples, biological information, an IC card and a wearable device are used for the authentication process. However, the authentication process may be performed by arbitrarily using other methods.

The locking module 208 includes the structure (fixing pin 24A) for maintaining the lock such that the tablet computer 20 cannot be separated from the keyboard dock 30.

Now, this specification explains the function structures of the keyboard dock 30. As the keyboard 31 is already explained, the detailed explanation of the keyboard 31 is omitted.

The security lock detector 301 outputs, to the lock determination module 303, a security lock detection signal indicating whether or not the security lock 40 is inserted into the security lock connection terminal 32 provided in the keyboard dock 30 at predetermined time intervals. The security lock detection signal is a signal which is output in the lock determination module 303 at predetermined time intervals as described above. The security lock detection signal is "high" when the security lock 40 is detected as being inserted into the security lock connection terminal 32. The security lock detection signal is "low" when the security lock 40 cannot be detected as being inserted into the security lock connection terminal 32 (in other words, when the security lock 40 is not inserted into the security lock connection terminal 32).

The tablet detector 302 receives the input of the tablet detection signal output from the tablet computer 20, and outputs the tablet detection signal to the lock determination module 303.

The lock determination module 303 each receives the input of the authentication information output from the tablet computer 20, the input of the security lock detection signal output from the security lock detector 301, and the input of the tablet detection signal output from the tablet detector 302. The lock determination module 303 executes a lock determination process which determines whether or not the lock by the locking module 305 should be engaged in a state where the lock by the locking module 305 is released based on the received authentication information, security lock detection signal and tablet detection signal. The lock determination module 303 executes an unlock determination process which determines whether or not the lock by the locking module 305 should be released in a state where the lock by the locking module 305 is engaged based on the received authentication information and security lock detection signal.

The motor 304 is driven in accordance with the instruction from the lock determination module 303, and controls whether or not the lock by the locking module 305 should be released or engaged. The locking module 305 includes the structures (the key 34A and the supporting point 34B) for preventing the separation of the tablet computer 20 from the keyboard dock 30. The above-described key structure 34 includes the motor 304 and the locking module 305.

Now, this specification explains unlocking conditions of the locking module 305, referring to FIG. 8.

FIG. 8 shows conditions for releasing the lock which prevents the separation of the tablet computer 20 from the keyboard dock 30 included in the two-in-one computer 10 according to the embodiment. As shown in FIG. 8, when the security lock 40 is attached, and the user authentication is valid, the tablet computer 20 can be separated from the keyboard dock 30. When the security lock 40 is attached, and the user authentication is invalid, the tablet computer 20 cannot be separated from the keyboard dock 30. On the other hand, when the security lock 40 is not attached, as shown in FIG. 8, the tablet computer 20 cannot be separated from the keyboard dock 30 regardless of the validity or invalidity of the user authentication.

Figure 9:
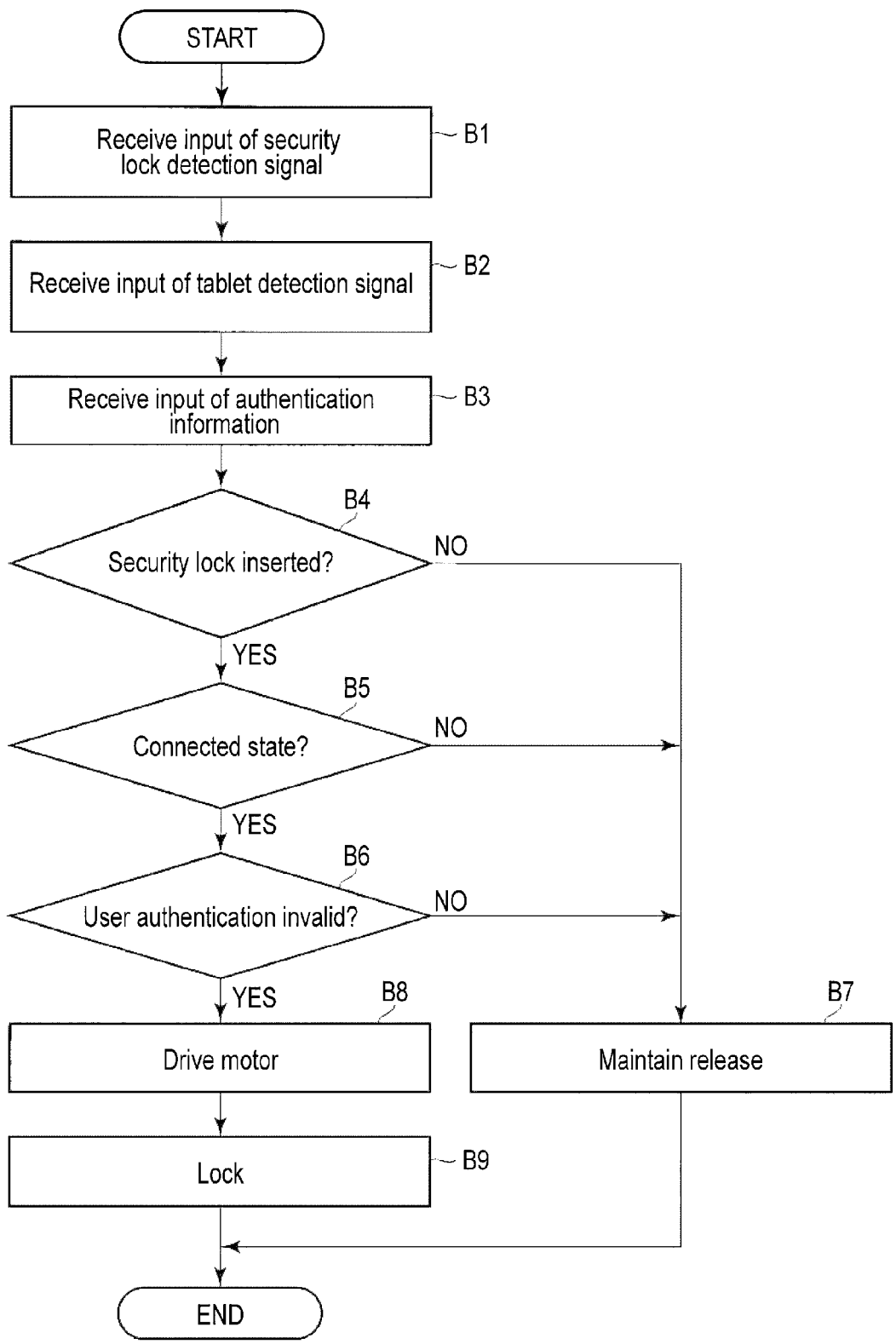
FIG. 9 is a flowchart showing examples of steps of a lock determination process executed by the two-in-one computer according to the embodiment.

Now, with reference to the flowchart of FIG. 9, this specification explains examples of steps of the lock determination process executed by the two-in-one computer 10 including the above structures. This figure assumes a case of connecting the tablet computer 20 which is separated from the keyboard dock 30 to the keyboard dock 30 in which the security lock 40 is inserted into the security lock connection terminal 32.

First, the lock determination module 303 included in the keyboard dock 30 receives the input of the security lock detection signal which is output from the security lock detector 301 at predetermined time intervals (block B1). Subsequently, when a tablet detection signal is output from the tablet detector 302, the lock determination module 303 receives the input of the tablet detection signal (block B2). Subsequently, the lock determination module 303 receives the input of the authentication information output from the tablet computer 20 (block B3).

Based on the security lock detection signal received by the step of block B1, the lock determination module 303 determines whether or not the security lock 40 is inserted into the security lock connection terminal 32. Specifically, the lock determination module 303 determines whether the polarity of the received security lock detection signal indicates "high" or "low" (block B4). When the lock determination module 303 determines that the security lock 40 is not inserted into the security lock connection terminal 32 by the step of block B4, or in other words, when the security lock detection signal indicates "low" (NO in block B4), the process proceeds to the step of block B7 explained later.

When the lock determination module 303 determines that the security lock 40 is inserted into the security lock connection terminal 32 by the step of block B4, or in other words, when the security lock detection signal indicates "high" (YES in block B4), the lock determination module 303 determines whether or not the tablet computer 20 is connected with the keyboard dock 30. Specifically, the lock determination module 303 determines whether or not the input of a tablet detection signal is received by the step of block B2 (block B5). When the lock determination module 303 determines that the tablet computer 20 is not connected with the keyboard dock 30 by the step of block B5, or in other words, when the input of a tablet detection signal is not received (NO in block B5), the process proceeds to the step of block B7 explained later.

When the lock determination module 303 determines that the tablet computer 20 is connected with the keyboard dock 30 by the step of block B5, or in other words, when the input of a tablet detection signal is received (YES in block B5), the lock determination module 303 determines whether or not the user authentication in the tablet computer 20 is invalid based on the authentication information received by the step of block B3 (block B6). When the lock determination module 303 determines that the user authentication in the tablet computer 20 is valid by the step of block B6 (NO in block B6), the lock determination module 303 does not engage the lock by the locking module 305, maintains the unlock state (block B7), and terminates the lock determination process.

When the lock determination module 303 determines that the user authentication in the tablet computer 20 is invalid by the step of block B6 (YES in block B6), the lock determination module 303 drives the motor 304 in order to engage the lock by the hook locking module 305 (or in other words, rotates the motor 304 in a direction engaging the lock), engages the lock by the locking module 305 (blocks B8 and B9), and terminates the lock determination process.

Figure 10:
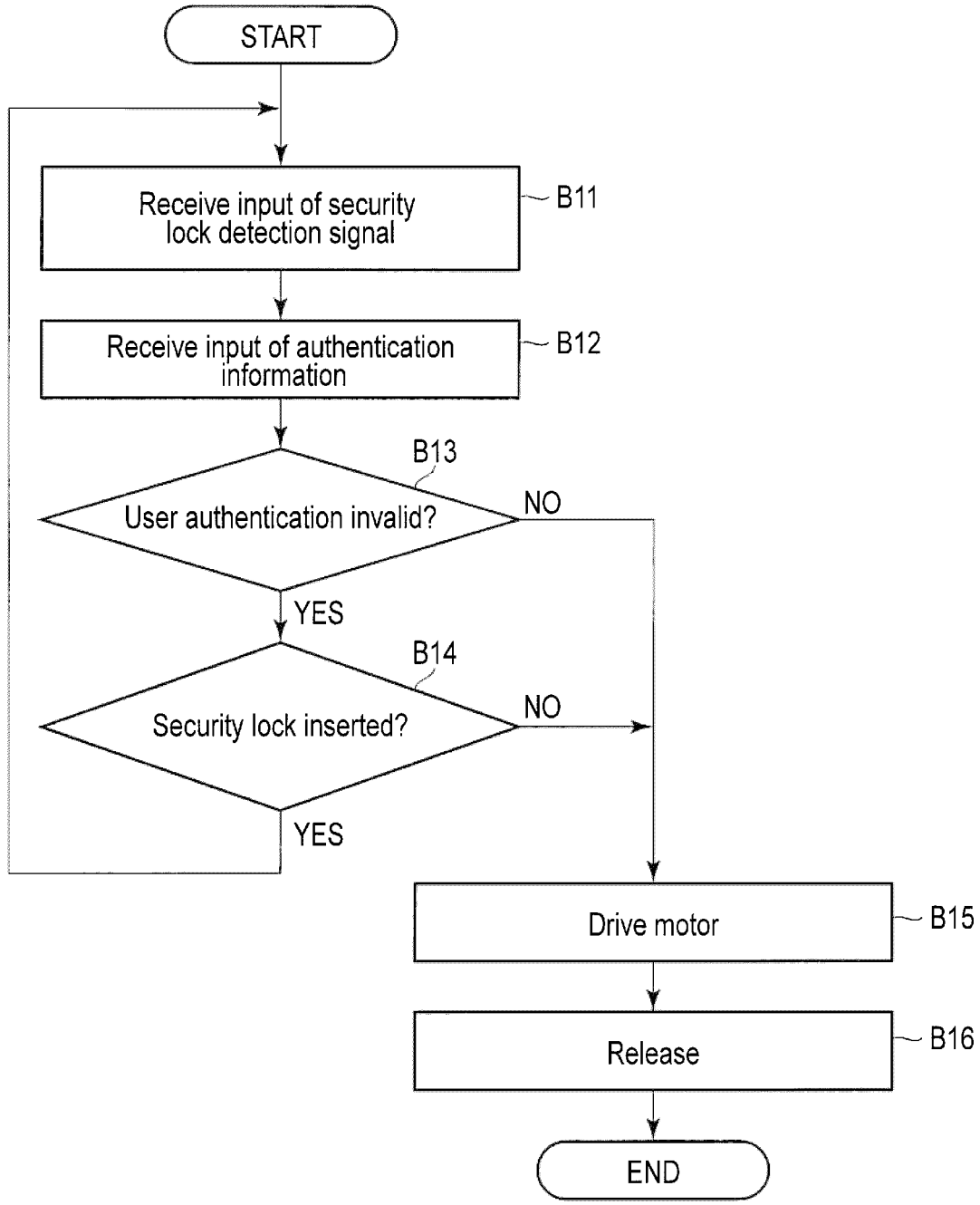
FIG. 10 is a flowchart showing examples of steps of an unlock determination process executed by the two-in-one computer according to the embodiment.

Now, this specification explains examples of steps of the unlock determination process executed by the two-in-one computer 10 with reference to the flowchart of FIG. 10. This figure assumes the following case: the security lock 40 is inserted into the security lock connection terminal 32, and the keyboard dock 30 is locked, and in association with this lock, the tablet computer 20 and the keyboard dock 30 are locked by the locking module 305.

First, the lock determination module 303 included in the keyboard dock 30 receives the input of the security lock detection signal which is output from the security lock detector 301 at predetermined time intervals (block B11). Subsequently, the lock determination module 303 receives the input of the authentication information output from the tablet computer 20 (block B12).

Based on the authentication information received by the step of block B12, the lock determination module 303 determines whether or not the user authentication in the tablet computer 20 is invalid (block B13). When the lock determination module 303 determines that the user authentication in the tablet computer 20 is valid by the step of block B13 (NO in block B13), the process proceeds to the step of block B15 explained later.

When the lock determination module 303 determines that the user authentication in the tablet computer 20 is invalid by the step of block B13 (YES in block B13), the lock determination module 303 determines whether or not the security lock 40 is inserted into the security lock connection terminal 32 based on the security lock detection signal received by the step of block B11. Specifically, the lock determination module 303 determines whether the polarity of the received security lock detection signal indicates "high" or "low" (block B14). When the lock determination module 303 determines that the security lock 40 is inserted into the security lock connection terminal 32 by the step of block B14, or in other words, when the security lock detection signal indicates "high" (YES in block B14), the above-described step of block B11 is performed again.

When the lock determination module 303 determines that the security lock 40 is not inserted into the security lock connection terminal 32 by the step of block B14, or in other words, when the security lock detection signal indicates "low" (NO in block B14), the lock determination module 303 drives the motor 304 in order to release the lock by the locking module 305 (in other words, rotates the motor 304 in a direction releasing the lock), releases the lock by the locking module 305 (blocks B15 and B16), and terminates the unlock determination process.

According to the above-described embodiment, the two-in-one computer 10 includes the structure which controls whether the lock for preventing the separation of the tablet computer 20 from the keyboard dock 30 should be released or engaged in accordance with the validity or invalidity of the user authentication by the fingerprint sensor 206 provided in the tablet computer 20. This structure enables the tablet computer 20 and the keyboard dock 30 to be separated from each other without taking much trouble even when the lock for preventing the separation of the tablet computer 20 from the keyboard dock 30 is engaged in association with the lock by the security lock 40 relative to the keyboard dock 30.

In the present embodiment, the lock for preventing the separation of the tablet computer 20 from the keyboard dock 30 is controlled by using the validity or invalidity of the user authentication by the fingerprint sensor 206 provided in the tablet computer 20. However, for example, to control the lock for preventing the separation of the tablet computer 20 from the keyboard dock 30, additional conditions may be set other than the user authentication by the fingerprint sensor

206. For example, when conditions in which the user authentication by the fingerprint sensor 206 is valid and the value of the battery of the tablet computer 20 is higher than or equal to a predetermined value are satisfied, the control operation may be performed such that the above-described lock is released. In a similar manner, when conditions in which the user authentication by the fingerprint sensor 206 is valid and the current time is within the time period set in the tablet computer 20 in advance are satisfied, the control operation may be performed such that the above-described lock is released. In sum, when the user authentication by the fingerprint sensor 206 is valid and the situation is suitable for carrying the tablet computer 20, the control operation may be conducted such that the above-described lock is released.

In the present embodiment, the fingerprint sensor 206 is provided in only the tablet computer 20. However, for example, a function similar to the fingerprint sensor 206 may be provided in only the keyboard dock 30, or a function similar to the fingerprint sensor 206 may be provided in the keyboard dock 30 as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
   a first electronic device;
   a second electronic device connectable with the first electronic device;
   a security lock configured to attach to the second electronic device when the first electronic device and the second electronic device are connected with each other, the security lock for preventing the second electronic device from being stolen; and
   in association with the security lock, a first lock for preventing separation of the first electronic device from the second electronic device, wherein
   the first electronic device comprises:
      an authentication processor to authenticate a user; and
      a notification processor to notify the second electronic device of authentication information indicating a result of authentication by the authentication processor, and
   the second electronic device comprises:
      a detector to detect whether the security lock is engaged, and output a detection signal indicating whether the security lock is engaged at time intervals;
      a determination processor to determine whether the first lock is to be released based on the notified authentication information when the detection signal indicates that the security lock is engaged; and
      an unlocking processor to release the first lock while the security lock is engaged when the determination processor determines that the first lock is to be released.

2. The information processing system of claim 1, wherein the second electronic device maintains the first lock when the determination processor determines that the first lock in association with the security lock is not to be released.

3. The information processing system of claim 1, wherein the second electronic device determines that the first lock in association with the security lock is to be released when the authentication information indicates that the user authentication is valid.

4. The information processing system of claim 1, wherein the unlocking processor releases the first lock while the first electronic device is connected with the second electronic device when the security lock is released.

5. The information processing system of claim 1, wherein the first electronic device is a tablet computer, and the second electronic device is a docking station connectable with the tablet computer.

6. An electronic device which is connectable with an external device allowed to output authentication information indicating whether a user authentication is valid, and engages a first lock for preventing separation from the external device when a security lock for preventing the electronic device from being stolen is attached in a state where the electronic device is connected with the external device, the electronic device comprising:
   a receiver to receive the authentication information output from the external device;
   a detector to detect whether the security lock is engaged, and output a detection signal at time intervals indicating whether the security lock is engaged;
   a determination processor to determine whether the first lock is to be released based on the received authentication information when the output detection signal indicates that the security lock is engaged; and
   an unlocking processor to release the first lock while the security lock is engaged when the determination processor determines that the first lock is to be released.

7. The electronic device of claim 6, wherein the unlocking processor maintains the first lock engaged in association with the security lock when the determination processor determines that the first lock is not to be released.

8. The electronic device of claim 6, wherein the determination processor determines that the first lock in association with the security lock is to be released when the authentication information indicates that the user authentication is valid.

9. The electronic device of claim 6, wherein the unlocking processor releases the first lock in association with the security lock while the electronic device is connected with the external device when the security lock is released.

10. A method executed by an electronic device which is connectable with an external device allowed to output authentication information indicating whether a user authentication is valid, and engages a first lock for preventing separation from the external device when a security lock for preventing the electronic device from being stolen is attached in a state where the electronic device is connected with the external device, the method comprising:
   receiving the authentication information output from the external device;
   detecting whether the security lock is engaged and outputting a detection signal at time intervals indicating whether the security lock is engaged;

determining whether the first lock is to be released based on the received authentication information when the output detection signal indicates that the security lock is engaged; and releasing the first lock while the security lock is engaged when the first lock is determined to be released.

11. The method of claim 10, further comprising maintaining the first lock in association with the security lock when the first lock is not determined to be released.

12. The method of claim 10, further comprising determining that the first lock in association with the security lock is to be released when the authentication information indicates that the user authentication is valid.

13. The method of claim 10, further comprising releasing the first lock in association with the security lock while the electronic device is connected with the external device when the security lock is released.

* * * * *